United States Patent

[11] 3,586,773

[72] Inventors Le Roy L. Niemyer, Jr.
Baltimore;
Edgar L. Irwin, Glen Burnie, both of, Md.
[21] Appl. No. 801,504
[22] Filed Feb. 24, 1969
[45] Patented June 22, 1971
[73] Assignee Westinghouse Electric Corporation
Pittsburgh, Pa.

[54] TELEVISION IMAGE TUBE PROTECTION SYSTEM

9 Claims, 5 Drawing Figs.

[52] U.S. Cl. 178/7.2, 178/7.92
[51] Int. Cl. H04n 5/26
[50] Field of Search 178/7.2 E, 7.92

[56] References Cited

UNITED STATES PATENTS

| | | | |
|---|---|---|---|
| 2,976,758 | 3/1961 | Parker | 178/7.2 E |
| 3,198,883 | 8/1965 | Borberg et al. | 178/7.2 E |

*Primary Examiner*—Robert L. Griffin
*Assistant Examiner*—Donald E. Stout
*Attorneys*—F. H. Henson and E. P. Klipfel

ABSTRACT: A protective system for a television camera tube includes photosensitive means, independent of the camera tube, responsive to the level of illumination in the scene scanned by the camera tube. The detector is responsive to point sources of illumination in the scene, independently of the average scene illumination, for producing a control signal to actuate protection means for the camera tube when any such point source approaches a level of illumination which would damage the camera tube.

INVENTORS
LEROY L. NIEMYER, JR.
EDGAR L. IRWIN

BY Ernest P. Klipfel
ATTORNEY

INVENTORS

LEROY L. NIEMYER, JR.
EDGAR L. IRWIN

BY Ernest P. Klipfel
ATTORNEY

TELEVISION IMAGE TUBE PROTECTION SYSTEM

BACKGROUND OF THE INVENTION

1. Field of the Invention

This invention relates to a protection system for image tubes, such as vidicons and image orthicons, and particularly for such image tubes when employed as television camera tubes. The protection system includes a detector responsive to point sources of illumination in the scene being scanned by the camera tube for actuating protective means for the camera tube when any such point source approaches a level of intensity which would damage the camera tube.

2. State of the Prior Art

Systems for preventing damage to light sensitive elements, such as the light sensitive screen of the television camera tube, are well known in the prior art. The prior art systems, however, have been inadequate for many reasons. For example, many prior art protection systems respond to the amplitude of the video signal generated by the camera tube and thus detect the occurrence of damaging light levels in the scene only after the scene has been scanned by the camera tube. In such systems, damage to the camera tube may occur before the protective means becomes operative. In addition, these systems typically generate an average, or integrated signal corresponding to an indication of the average scene illumination. Other prior art systems independently respond to the scene being scanned by the camera tube, but again typically generate a control signal which is responsive to the average scene illumination.

In protection systems which average the scene illumination, a compromise must be made between two extremes of detection. At one extreme, the detector must have sufficiently great sensitivity to enable response to bright point sources of illumination in the scene, such that the detected level of average scene illumination adequately reflects the existence of the point sources. Typically, the control signal produced by the detector reduces the sensitivity of the camera tube as the detected level of illumination in the scene being scanned increases.

In such a system, there result unnecessary reductions in the camera tube sensitivity, or complete turnoff of the camera tube. For example a scene may contain a large number of bright point sources, none of which exceeds a damaging light level. The detected average level of illumination, however, would result in a control signal causing a reduction in the camera tube sensitivity. The reduction in sensitivity was not necessary to protect the camera tube, and information in the remaining portions of the scene, of lower intensity level, is not detected by the camera tube.

At the other extreme, the detector sensitivity may be reduced to provide response only to average scene illumination. Although unnecessary and undesired reductions in camera tube sensitivity are thereby avoided, the more serious problem of damage to the camera tube from one or a few bright point sources of light is presented, since such source or sources contribute only insignificantly to the detected average scene illumination.

Modern day camera tubes have great sensitivity to permit detection of scenes having very low light levels, and a relatively wide range of illumination levels which can be detected without damage to the camera tubes. However, the levels of illumination in typical scenes may vary by as much as $10^7$:1. This ratio may be even higher when brilliant point sources of light are contained in a scene.

Detectors of the averaging type heretofore available therefore are particularly inadequate for protecting such highly sensitive tubes, at either extreme of operation or at any compromise between the extremes. Such detectors either prevent full utilization of the sensitivity of the camera tube, or fail to protect the camera tube at all, or suffer from both of these defects when a compromised level of detection between these extremes is selected.

SUMMARY OF THE INVENTION

The protection system of the invention overcomes these and other defects of image tube protection systems of the prior art. The system of the invention is capable of detecting the illumination level of a point source of light, or of each of the plurality of point sources of light, independently of the illumination level of the surrounding portions of the scene. The detector of the invention is independent of the camera tube, although it responds to the same scene being scanned by the camera tube, and thus is enabled to actuate protective means before the camera tube responds to, or is damaged by, damaging light levels contained in the scene. The protection system of the invention enables the camera tube to be operated at all times at full sensitivity, in the absence of damaging illumination levels in the scene.

In accordance with the invention, the protection system includes a detector which is exposed to the same field of view as the camera. Preferably, the field of view of the detector exceeds that of the camera to provide a protection signal in advance of exposing of the camera to damaging light levels in panning operations.

An array including a large number of discrete photosensitive switching elements is provided in the detector. Each of the elements is responsive to the light level in a corresponding small portion or segment of the scene included within the field of view. In the preferred embodiment, the array comprises a substrate in which the elements are developed by conventional diffusion techniques in a matrix of closely spaced, isolated islands. Each of the elements comprises a photosensitive, multilayer solid state device such as a photosensitive thyristor. The elements are connected in parallel at their input terminals to a source of energizing potential and at their output terminals effectively to ground. Preferably, and depending on the size of the array, i.e., the number of elements in the array, the elements are arranged in a matrix configuration of plural rows with each row including a large number of elements. Each such row is connected to the energizing source through an automatic reset circuit.

The elements have common switching characteristics in switching from a first stable state of nonconduction to a second stable state of conduction. The level at which switching occurs is a function of the illumination incident on a given element. The potential level of the energizing source is adjusted such that an element will switch to the conducting state only when the level of illumination incident on that element approaches a level which would damage the camera tube.

A common output means is provided on the array for all elements of the array. When any element switches, a voltage pulse is generated which is capacitively coupled to the common output means. The protective mechanism of the protection system responds to this output pulse to protect the camera tube. Therefore, each element of the array is substantially continuously interrogated, simultaneously with all other elements of the array. As noted above, after switching, the element or elements are automatically reset but will continue to switch as long as the damaging light level source in the scene persists. The rate of reset is selected in relation to the holding time of the control system for the protective mechanism to assure continuous protection of the camera tube during damaging light level conditions.

The protection system may take any of various forms. For example, it may comprise a mechanical shutter or filter system actuated to block the illumination from the light sensitive screen of the camera and which may be automatically opened upon cessation of the damaging light level in the scene. Alternatively, an electrical sensitivity adjustment may be effected in the camera tube. Any suitable protection mechanism, or combinations thereof may be employed with the detector of the invention.

DETAILED DESCRIPTION OF THE INVENTION

Figure 1:
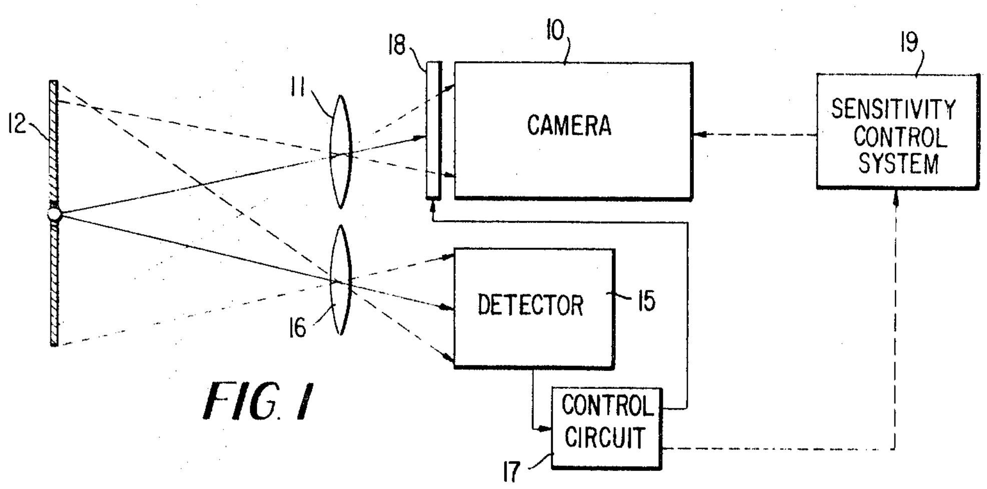
FIG. 1 shows, in block diagram form, a television camera system employing the protection system of the invention.

In FIG. 1 is shown a block diagram of the television camera system employing the protection system of the invention. The camera 10 includes a suitable optical system 11 for focusing light rays from a scene 12 onto a light sensitive screen contained within the camera 10. The camera 10 may represent a complete television pickup system and particularly includes an image tube such as a vidicon or an image orthicon.

The detector 15 similarly includes an optical system 16 for focusing rays from the same scene 12 onto a photosensitive means within the detector 15. As schematically illustrated, the field view of the detector 15 is preferably greater than that of the camera 10 such that in panning operations, the detector 15 will detect marginal areas prior to the light rays from those areas being focused onto the light sensitive screen of the camera 10 affording advance protection for the camera 10 in the event that those marginal areas contain sources of light of damaging intensity levels.

As described in more detail hereinafter, the detector 15 responds to point sources of illumination within the scene 12 being scanned by the camera. Since the scene may be considered to comprise a composite of a large number of point sources, it is apparent that the detector 15 in effect responds to the totality of the sources of illumination within the scene 12.

The detector 15 produces an output only when there is detected in the scene 12 one or more point sources of light of a damaging intensity level. The output signal of detector 15 is applied to a control circuit 17 which may actuate any of various suitable means for protecting the camera 10 from the damaging illumination. For example, there is illustrated a shutter 18 which may be actuated by the control circuit 17 to a closed position to block the illumination from being focused onto the light sensitive screen of the camera 10. Alternatively, the element 18 may comprise suitable filters or the like, which are inserted to decrease the intensity of the illumination incident on the screen of the camera 10. Another form of protective mechanism comprises a sensitivity control system 19 which responds to the output signal from control circuit 17 to effect a suitable adjustment of the sensitivity of the camera 10.

As described in detail hereafter, the output pulse from detector 15 varies in amplitude as an inverse function of the level of incident illumination. Thus, the control circuit 18 may include a level detection circuit for determining whether the level of illumination is within range within which the sensitivity of the camera 10 may be decreased by the control system 19 or whether a filter may be inserted, thereby to permit the camera to remain operative, or whether the level is sufficiently high that a protective system such as shutter 18 must be actuated to completely block the illumination from the camera screen. The protective mechanisms may be employed in the alternative or in any suitable combination to effect protection.

Figure 2:
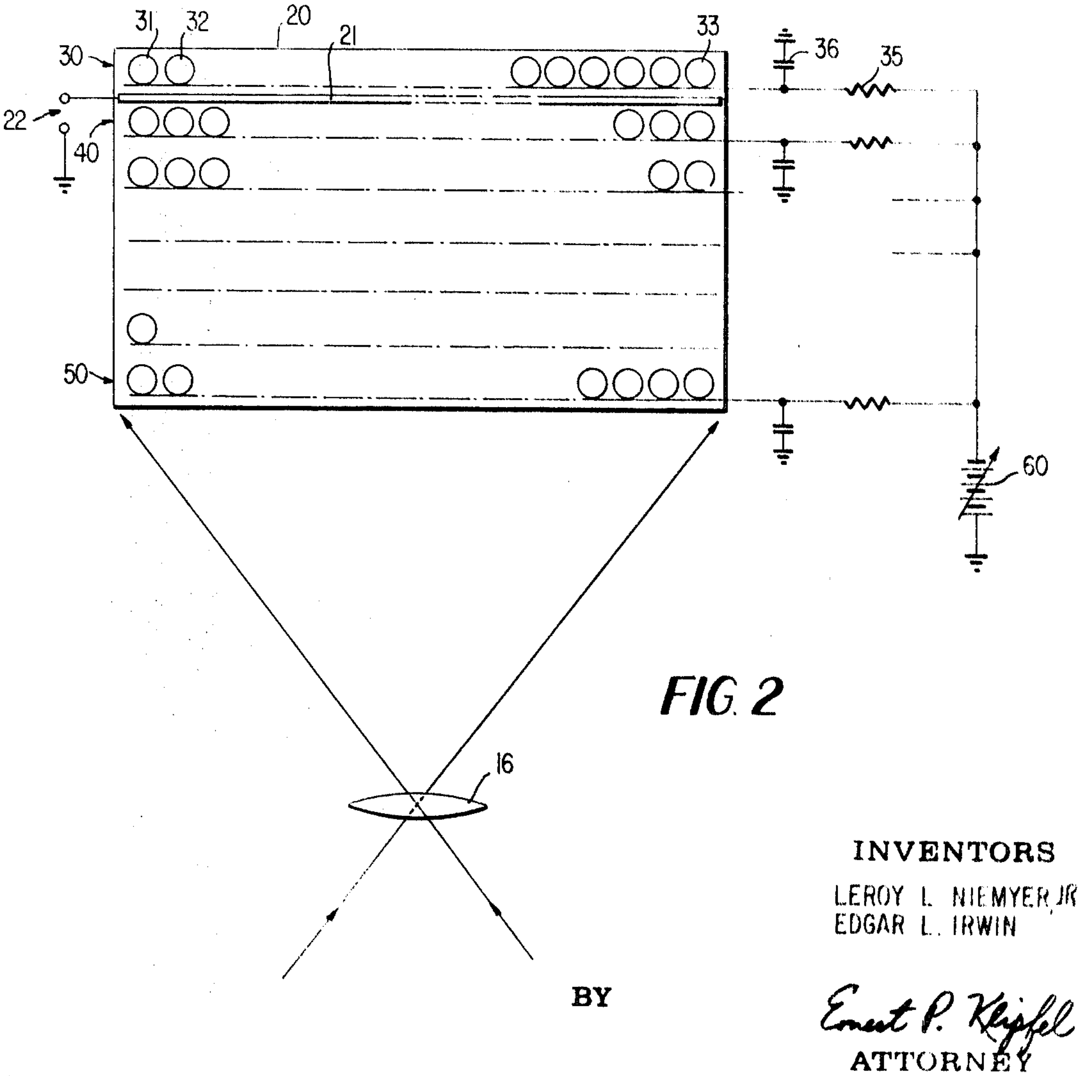
FIG. 2 is a schematic representation of the detector of the invention.

In FIG. 2 is shown a schematic representation of an array 20 suitable for use in the detector 15 of the system of FIG. 1. The array 20 includes a plurality of photosensitive switching elements preferably arranged in a matrix of a plurality of rows 30, 40,...50. Each of the rows includes a plurality of photosensitive switching elements, and, for example, the row 30 includes the switching elements 31, 32,...33. Corresponding switching elements of the plurality of rows preferably are aligned in vertical columns.

The elements of each row are connected through an energizing and reset circuit to a source of energizing potential of adjustable value, shown as a battery 60. The energizing and reset circuit for each row comprises, for example, a resistor 35 connected between the input to the row and the battery 60, and a capacitor 36 connected between the input to the row and ground potential.

The array 20 includes a common output means 21 for all elements of the array, the output means 21 being connected to output terminals 22 of the array. As described in detail hereinafter, the common output means 21 may comprise a conductive layer positioned in insulated, spaced relationship from the switching elements of the array. Upon switching of any one or more of the elements of the array, a voltage pulse is capacitively coupled into the common output means 21 and conducted to the output terminals 22. The switching occurs as a result of the illumination incident on the elements of the array 20, focused thereon from the scene by the lens 16, as shown diagrammatically in FIG. 1.

Figure 3:
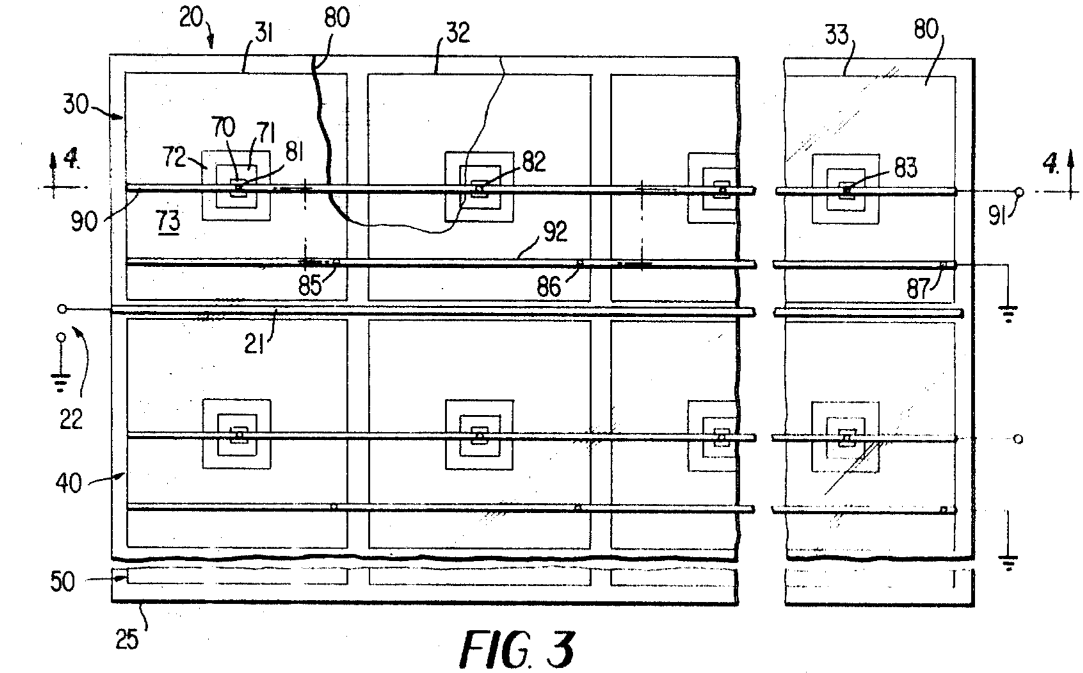
FIG. 3 is a plane view of a light sensitive array employed in the detector of the invention.
Figure 4:
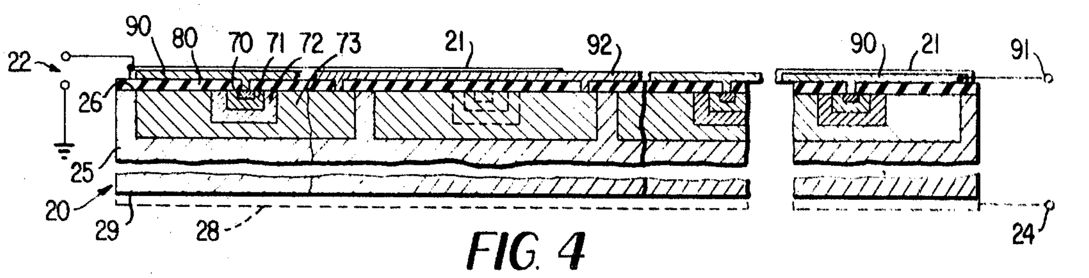
FIG. 4 is a cross-sectional view of the array taken along the line 4—4 in FIG. 3.

FIG. 3 comprises a plane view of a portion of the array of FIG. 2 in which a few of the individual switching elements of the array are shown on a greatly enlarged scale for purposes of explanation. FIG. 4 is a cross section taken along the line 4—4 of FIG. 3.

Referring concurrently to FIGS. 3 and 4, the array 40 comprises a substrate 25 in which the photosensitive elements are developed as a plurality of isolated islands by conventional diffusion techniques. In the example of FIGS. 3 and 4, the substrate 25 is of P-type material. Each of the photosensitive switching elements comprises a multilayer solid state device such as a thyristor, of identical construction. For example, the thyristor element 31 includes a first region 70 of P-type material, a second region 71 of N type material, and third region 72 of P-type material, and a fourth region 73 of N type material. Each of the successive regions or layers is received as an island in the net successive region, and all regions terminate in a portion presented in a common planar surface 26. A portion of the substrate 25 extends to the common planar surface 26 as an isolation band, and surrounds and thereby effectively isolates each of the thyristor elements from one another. Whereas NPNP type thyristors are shown, it will be apparent that PNPN types might be employed in the alternative, and that an N-type substrate would then be employed. The exact configuration of the regions of each element is not limited to that shown, and any suitable switching element having characteristics as described below may be employed in the array.

A layer 80 of insulating material is provided on the planar surface 26 of the array 20. By use of conventional photoresist and etching procedures, various windows, to be described, are formed in the insulating layer 80 to expose at the surface 26 selected regions of the thyristors. In each of the rows, a first series of windows 81, 82,...83, is formed to expose the underlying, first P region 70, and a second series of windows 85, 86,...87, is provided to expose the underlying, fourth N region of the thyristors 31, 32,...and 33, respectively. These first and fourth regions define the input and output of the elements, between which the switching operation from nonconducting to conducting states is experienced.

After formation of the windows in the insulating layer 80, and through suitable deposition and masking techniques, a plurality of conductors is deposited on the array to provide a parallel connection of the thyristors of each row for connection thereof to the energizing and reset circuits, as shown in FIG. 2, and the ground potential. For example, in the first row, a first conductor 90 is deposited on the array, over the insulating 80 and extending through the windows 81, 82,...and 83 to provide connection to the first P region 70 of each of the thyristors 31,32,...and 33 of the first row 30 of the array. The conductor 90 is further connected to a row input terminal 91. A second conductor 92 is also deposited over the insulating layer 80, extending through the windows 85, 86,...and 87 to provide connection to the fourth N region of the thyristors 31, 32,...and 33 of the first row. The conductor 92 is further connected to ground potential, as indicated. Preferably, the conductors are sintered to form an ohmic bond with the regions of the thyristors which they respectively contact. As explained in more detail in the description of operation which follows hereinafter, the above-described conductors provide a parallel connection of the elements of each row of the array between the power input terminals of the row corresponding to the input terminal 91 and the terminal connected to ground potential.

As noted previously, a common output means is provided for all elements of the array. Alternative forms of this common output may be employed. A first form comprises the output conductor 21 positioned on the insulating layer 80 over the isolation band intermediate the first and second rows 30 and 40 of the array, as shown in FIG. 2. This conductor 21 is thus effectively positioned in spaced, insulated relationship to all elements of the array whereby capacitive coupling between each of these elements and the common output conductor is provided. An alternative form of the output common to all elements of the array comprises a conducting layer or plate 28 received on the lower surface 29 of the substrate 25 opposite to that of the common surface 26 at which each of the thyristor elements is exposed. The plate 28 is thus positioned in spaced, insulated relationship from each of the switching elements of the array and similarly provides for capacitive coupling to each of these elements. The plate 28 is connected to an output terminal 22'.

Figure 5:
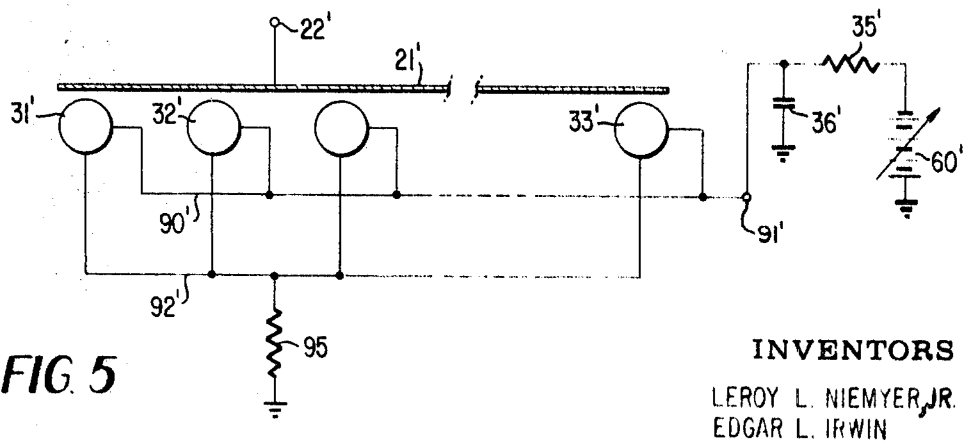
FIG. 5 is a schematic representation of a single row of photosensitive elements connected in parallel in accordance with the array of FIGS. 3 and 4.

The operation of the array is described with reference to the schematic representation of a single row of the array shown in FIG. 5. The elements 31', 32',...and 33' correspond to the thyristor elements 31, 32,...and 33 of FIGS. 3 and 4. The lead 90' connected to input terminal 91' corresponds to the conductor 90 and input terminal 91 of FIGS. 3 and 4 and the lead 92' corresponds to the conductor 92 of FIGS. 3 and 4. Resistor 95 represents the inherent, internal resistance of the parallel connected thyristors, and provides a load resistance for all thyristors of the row. The common output plate 21' may correspond to either of the common output means 21 and 28 of FIGS. 3 and 4 and is spaced from the switching elements 31', 32',...and 33' to represent the capacitive coupling therebetween. The plate 21' is connected to an output terminal 22'. The variable potential battery 60' corresponds to the battery 60 of FIG. 2. The positive terminal of the battery 60' is connected through the resistor 35' to the input terminal 91' of the illustrated row of switching elements, the terminal 91' further being connected to the ground potential through the capacitor 36'.

All of the photosensitive thyristor elements are substantially of identical construction and therefore have common switching characteristics. Particularly, each presents a common breakover voltage, in the absence of incident illumination, at which the element switches from a first stable state of nonconduction to a second stable state of conduction in which the voltage across the element drops to a minumum sustaining level for conduction. Further, the breakover voltage for all elements varies in substantially identical manner as a function of the illumination incident on the elements.

In operation, the energizing potential supplied by the battery 60' initially causes a flow of current through the resistor 35' and the capacitor 36' to charge the latter to essentially the potential of the battery 60'. This potential is applied in common, or in parallel, to all of the switching elements of a given row and thus to all of the elements 31', 32',...and 33' of the first row illustrated in FIG. 5.

The potential of the battery 60' is adjusted to supply, to each of the elements of a given row, in parallel, a potential which slightly exceeds the breakover voltage for a level of intensity of incident illumination sufficient to cause damage to the light sensitive screen of the camera. Thus, in the absence of point sources of illumination of a damaging intensity level, all of the elements of the array are in a nonconducting state.

When a point source of light in the scene approaches the damaging level of intensity, the switching element on which illumination from that point source is focused will be switched to a conducting state. As is apparent, all elements having incident thereon illumination of a damaging level will switch simultaneously in this manner, due to this parallel connection thereof.

When any element of any row switches to the conducting state, an effective short circuit connection across the terminals of the capacitor of the energizing circuit for that row is produced. For example, the element 31', when switched to the conducting state, effectively short circuits the capacitor 36', causing it to rapidly discharge to ground potential. The resistor 35' is selected to be of sufficient magnitude such that the resultant current flow from the source 60', through the resistor 35' and the conducting one of the switching elements and the load resistor 95 to ground, produces a voltage drop across the resistor 35' of sufficient magnitude such that the voltage level available at the input terminal 91' is below the minimum sustaining level for conduction of the switched element. The switched element, or elements, thereupon automatically reverts or resets, to the first, nonconduction stable state. The capacitor 36' is again charged through the resistor 35' by a flow of current from the source 60' until the potential thereacross is equal to that of the source 60'.

The rate of interrogation of the array is therefore a function of the switching time of the independent elements of the array, and thus is related to the material constants of the switching elements of the array, and of the RC time constant of the energizing and reset circuit associated with a given row of array. The energizing and reset circuits, although employing only passive elements, provide automatic reset of the array following each occasion in which a point source of light of damaging intensity level is detected in the scene.

The element switched by such a point source of light produces an output voltage across the load resister 95 which is capactively coupled to the common output means 21' and supplied to the output terminal 22' of the array. Since the breakover voltage is a function of the material constants of the switching elements, which value is constant for all elements of a given array, and of the illumination incident on the element switched, particularly varying as a direct function of that incident illumination, the amplitude of the output pulse will vary as an inverse function of the level of incident illumination.

It will be appreciated that, although each element of the array has incident thereon the illumination from a corresponding small segment of the scene being scanned by the camera, and detects the condition at which that incident illumination approaches a level which would damage the camera tube, only a single output pulse from the entire array is employed to provide that indication. The protection system, of course, does not require identification of the specific location in the scene of the point source of light, the intensity of which is approaching the damage level. Should it be desired to have such an indication, however, the array may be constructed and interrogated in accordance with teaching of such an array in the concurrently filed application which issued as U.S. Pat. No. 3,504,114 on Mar. 31, 1970 titled "Photosensitive Image System" of Edgar L. Irwin et al., assigned to the assignee of the present invention.

In summary, the detector of the protective system of the subject invention provides for responding to point sources of light in a scene being scanned, regardless of the average scene illumination, for producing a control signal when any such point source of light approaches an intensity level which would damage the light sensitive screen of a camera tube, such as employed in a television camera pickup system. The array of the detector operates independently of the camera in responding to the illumination in the scene being scanned by the camera, and preferably includes a wider field of view than that of the camera to permit detection of peripheral regions of the camera field of view to afford advance protection in panning operations. The array of the detector is of very compact size and preferably comprises a unitary structure of a substrate in which are formed a large number of independently operable photosensitive elements, such as thyristors. The array employs a very simplified logic structure for read out, assuring maximum density of sensing elements, affording a high degree of resolution in detecting point sources of light in the scene being scanned. Due to the absence of complex connections to the element, maximum exposure of the individual elements is afforded, thereby providing a high degree of sensitivity for detecting point sources of light damaging intensity levels. As noted, various forms of protective systems may be actuated in response to an output signal from the detector. If desired, a level detection system may be incorporated in the control circuit for determining the nature of control to be effected, be it an adjustment of sensitivity, the insertion of light intensity reducing filters between the scene and the light sensitive screen of the camera, or the complete blocking of illumination from the light sensitive screen of the camera. The detector of the invention permits the camera to be operated at maximum sensitivity at all times, and only to be reduced in sensitivity or completely blocked from the scanning of the scene when there actually occurs a source of illumination in the scene which approaches a level of intensity which would damage the light sensitive screen of the camera tube.

We Claim:

1. A protection system for a camera for detecting point sources of illumination of damaging intensity level in a scene viewed by the camera comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and each of said elements includes an input and an output, said inputs being connected in common to effect a parallel connection of all of said elements to said energizing means.

2. A protection system for a camera for detecting point sources of illumination of damaging intensity level in a scene viewed by the camera, comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and each of said elements comprises a photosensitive thyristor which includes an input and an output, said inputs being connected in common to effect a parallel connection to all of said elements to said energizing means.

3. A protection system for a camera for detecting point sources of illumination of damaging intensity level in a scene viewed by the camera, comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and each of said elements comprises a four region solid state device which includes an input and an output, said inputs being connected in common to effect a parallel connection of all of said elements to said energizing means.

4. A protection system for a camera for detecting point sources of illumination of damaging intensity level in a scene viewed by the camera, comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and said array includes a common substrate, each of said elements comprising a plural region solid state device formed as an isolated island in said substrate with the regions of each of said switching elements defining the power input and output thereof terminating in a common planar surface of said substrate and an insulating layer over said common planar surface having windows formed therein to expose the input and output of each of said switching elements, and said energizing means includes conductor means received on said insulating layer and selectively extending through said windows for connecting the inputs of all elements and outputs of all elements to common input and output terminals of said array, to which terminals an energizing potential is supplied.

5. A protection system as recited in claim 4 wherein said output deriving means comprises a conducting layer received on said insulating layer of said array and spaced from said conductor means.

6. A protection system as recited in claim 4 wherein said output means comprises a conducting layer received on the surface of said substrate opposite to said common planar surface.

7. A protection system as recited in claim 4 wherein said array includes a common substrate of P-type material and each of said elements comprises a PNPN solid state device.

8. A protection system for a camera for detecting point sources of illumination of damaging intensity level in a scene viewed by the camera, comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and said energizing means comprises a charging network connected between a source of energizing potential and said elements of said array, said changing network being charged from said source at a rate determined by the time constants of said network when said elements are in said first state of nonconduction to establish an energizing potential to enable switching of said elements, and being discharged upon switching of any of said associated elements to said second stable state of conduction to a potential level less than the minimum sustaining potential level for maintaining conduction of said elements.

9. A protection system for a camera for detecting point sources of illumination of damaging intensity level in a scene viewed by the camera, comprising:

a detector including an array of photosensitive switching elements exposed to the scene viewed by the camera, each of said elements being responsive to a corresponding segment of the scene for individual detection of a point source of illumination in that corresponding segment, said elements having common switching characteristics for switching between a first stable state of nonconduction and a second stable state of conduction, and being responsive to the level of incident illumination to vary the level at which said switching occurs, means for energizing each of said elements of said array in said first stable state of nonconduction for switching thereof to second stable state of conduction in response to incident illumination of a predetermined level relative to the damaging intensity level, means for deriving an output from said array in response to switching of any of said elements, and said array includes a plurality of rows of said elements, the elements of each row being connected in parallel to said energizing means, and said energizing means comprises a charging network connected between a source of energizing potential and said elements of said array, said charging network being charged from said source at a rate determined by the time constants of said network when said elements are in said first state of nonconduction to establish an energizing potential to enable switching of said elements, and being discharged upon switching of any of said associated elements to said second stable state of conduction to a potential level less than the minimum sustaining potential level for maintaining conduction of said elements.